United States Patent
Luebbering et al.

(10) Patent No.: US 8,137,499 B2
(45) Date of Patent: Mar. 20, 2012

(54) METHOD FOR REINFORCING A FIBRE COMPOSITE COMPONENT AND A VACUUM MAT AND ARRANGEMENT FOR PRODUCING A REINFORCED FIBRE COMPOSITE COMPONENT

(75) Inventors: Christian Luebbering, Gruenendeich (DE); Hauke Lengsfeld, Helmste (DE); Roland Brandenburg, Tostedt (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 12/816,853

(22) Filed: Jun. 16, 2010

(65) Prior Publication Data

US 2010/0314042 A1 Dec. 16, 2010

Related U.S. Application Data

(63) Continuation of application No. PCT/EP2008/065699, filed on Nov. 17, 2008.

(60) Provisional application No. 61/008,401, filed on Dec. 20, 2007.

(30) Foreign Application Priority Data

Dec. 20, 2007 (DE) .......... 10 2007 061 431

(51) Int. Cl.
| | |
|---|---|
| B29C 65/00 | (2006.01) |
| B29C 35/00 | (2006.01) |
| B29C 45/00 | (2006.01) |
| B29C 39/00 | (2006.01) |
| B29C 47/00 | (2006.01) |
| B29C 43/10 | (2006.01) |
| B29C 49/00 | (2006.01) |
| B29C 47/76 | (2006.01) |
| B32B 37/00 | (2006.01) |
| B28B 21/36 | (2006.01) |
| B28B 1/26 | (2006.01) |
| B28B 21/08 | (2006.01) |
| A23P 1/00 | (2006.01) |
| B29B 11/06 | (2006.01) |
| A01J 21/00 | (2006.01) |
| A01J 25/12 | (2006.01) |
| H05B 7/00 | (2006.01) |

(52) U.S. Cl. ........ 156/286; 156/285; 156/287; 156/381; 156/382; 425/503; 425/504; 425/546; 425/405.1; 425/85; 264/468; 264/46.8; 264/87; 264/511; 264/571; 264/101

(58) Field of Classification Search .................. 156/285, 156/286, 287, 381, 382; 425/503, 504, 546, 425/388, 405.1, 85; 264/468, 46.8, 87, 511, 264/526, 553, 566, 568, 571, 101
See application file for complete search history.

(56) References Cited

U.S. PATENT DOCUMENTS

| | | | |
|---|---|---|---|
| 4,451,321 A * | 5/1984 | McKelvey | .................... 156/382 |
| 5,217,669 A * | 6/1993 | Dublinski et al. | ............. 264/258 |
| 5,716,488 A * | 2/1998 | Bryant | .......................... 156/382 |
| 6,551,091 B1 | 4/2003 | Bryant et al. | |

FOREIGN PATENT DOCUMENTS

| | | |
|---|---|---|
| DE | 3145698 A1 | 5/1983 |
| DE | 3739753 A1 | 6/1989 |
| DE | 69109642 T2 | 9/1995 |
| EP | 0235512 A2 | 9/1987 |
| WO | WO 2009/080410 | 7/2009 |

OTHER PUBLICATIONS

German Office Action from DE 10 2007 061 431.6 dated Jun. 27, 2008. International Search Report and Written Opinion from PCT/EP2008/065699 dated Feb. 9, 2009.

* cited by examiner

*Primary Examiner* — Khanh P Nguyen
*Assistant Examiner* — Matthew Hoover
(74) *Attorney, Agent, or Firm* — Jenkins, Wilson, Taylor & Hunt, P.A.

(57) ABSTRACT

In a method for reinforcing a fiber composite component for aviation and space flight, a vacuum mat is configured with at least one receiving portion for reproducibly receiving at least one reinforcing element. The at least one reinforcing element is introduced into the at least one receiving portion of the vacuum mat. The vacuum mat with at least one introduced reinforcing element is applied reproducibly in a sealed manner to the fiber composite component to be reinforced to form a mold portion and at least the formed mold portion is cured to connect the at least one reinforcing element to the fiber composite component. The vacuum mat is then removed from the reinforced fiber composite component so that the vacuum mat can be reused.

11 Claims, 5 Drawing Sheets

METHOD FOR REINFORCING A FIBRE COMPOSITE COMPONENT AND A VACUUM MAT AND ARRANGEMENT FOR PRODUCING A REINFORCED FIBRE COMPOSITE COMPONENT

CROSS-REFERENCE TO RELATED APPLICATIONS

This application is a continuation of PCT/EP2008/065699 filed Nov. 17, 2008 and claims the benefit of U.S. Provisional Application No. 61/008,401, filed Dec. 20, 2007 and German Patent Application No. 10 2007 061 431.6, filed Dec. 20, 2007, the entire disclosures of which are herein incorporated by reference.

FIELD OF THE INVENTION

The present invention relates to a method for reinforcing a fibre composite component, in particular for aviation and space flight, and to a vacuum mat and an arrangement for producing a reinforced fibre composite component of this type.

Although the present invention and the problem on which it is based can be applied to any fibre composite components, in the following they will be described in detail in respect of planar, stringer-reinforced carbon fibre plastics material (CFRP) components (also called fibre composite components), for example skin shells of an aircraft.

It is generally known to reinforce CFRP skin shells with CFRP stringers to withstand the high stresses in the field of aviation with the lowest possible additional weight. In this respect, different types of stringers are used, for example T, Ω or I stringers.

The cross section of T-stringers is composed of the base and the bar. The base forms the connecting surface to the skin shell. The use of skin shells reinforced with stringers, for example T-stringers is widespread in aircraft construction, particularly in the vacuum infusion process for introducing a matrix, for example an epoxy resin, into fibre semi-finished products. Compared to other known methods for the production of fibre composite components, for example the prepreg process, infusion processes can be cost-effective as they allow the use of more economic fibre semi-finished products.

The term "fibre semi-finished products" is understood as meaning woven fabrics, interlaid scrims and fibre mats. These are provided with a matrix, for example an epoxy resin, and then cured, for example in an autoclave.

In the vacuum infusion process, drapable single-use polyamide films are presently used to form so-called vacuum bags. The wrapping process of a component is carried out completely by hand which, particularly in the case of reinforcing elements, for example the above-mentioned stringers, is very time consuming, because the vacuum film has to be guided over these reinforcing elements while precisely following the contour thereof in order to prevent distortion of the component. In addition, to achieve tightness against the atmosphere, the vacuum film has to be sealed, which is performed by applying appropriate sealing tapes, also by hand. Due to the manual process management, the reproducibility suffers from considerable unreliability, such that for example for positioning reinforcing elements on a fibre composite component, great tolerances are required which can lead to an increase in weight of the component. Faulty vacuum superstructures can ultimately result in rejection of the component.

The single-use film per se can be used only with pre-cured T-shaped reinforcing elements or other reinforcing elements. Uncured T-shaped reinforcing elements or other reinforcing elements require an additional support inside or outside the vacuum structure. Furthermore, in this manufacturing technology, wet stringers, i.e. uncured stringers have to be milled off after curing to their respective specified size. After curing, a considerable manual effort is required in order to remove the single-use film and the sealing tape.

SUMMARY OF THE INVENTION

Against this background, the object of the present invention is to provide a method for reinforcing a fibre composite component as well as a vacuum mat and an arrangement for producing a reinforced fibre composite component in order to overcome or considerably reduce the above-mentioned disadvantages.

This object is achieved according to the invention by a method which has the features of claim 1, by a vacuum mat with the features of claim 7 and by an arrangement with the features of claim 16.

According thereto, a method for reinforcing a fibre composite component for aviation and space flight is provided in which a vacuum mat is configured with at least one receiving portion for the reproducible accommodation of at least one reinforcing element. The at least one reinforcing element is introduced into this receiving portion of the vacuum mat. The vacuum mat is then reproducibly applied with at least one introduced reinforcing element to the fibre composite component which is to be reinforced, in a sealed manner to form a mould portion which is then cured to connect the at least one reinforcing element to the fibre composite component. Thereafter, the vacuum mat is removed from the reinforced fibre composite component and prepared to be reused.

Furthermore, a vacuum mat is provided to produce a reinforced fibre composite component for aviation and space flight. The vacuum mat has at least one receiving portion for receiving at least one reinforcing element. A self-sealing portion is arranged peripherally on the vacuum mat to seal off the vacuum mat from the atmosphere when contacting an associated contact surface. Furthermore, the vacuum mat has at least one contact portion for cooperating with an associated vacuum mat transportation means.

An arrangement for producing a reinforced fibre composite component for aviation and space flight is also provided. The fibre composite component to be reinforced is supported on a base plate. The arrangement also comprises a vacuum mat which has at least one receiving portion for receiving at least one reinforcing element. The vacuum mat can be transported with at least one introduced reinforcing element into a predetermined position relative to the fibre composite component to be reinforced by a vacuum mat transportation means. The base plate and the vacuum mat transportation means have mutually corresponding centring means for a reproducible positioning of the vacuum mat relative to the fibre composite component to be reinforced. Furthermore, the base plate and the vacuum mat have mutually corresponding sealing means for an encircling sealing of the vacuum mat from the atmosphere.

Thus, the present invention has the advantage over the approaches mentioned at the outset that the expenditure of time is greatly reduced because a large amount of the manual work is omitted. Furthermore, an increased reproducibility and positioning accuracy is achieved which reduces the risk of rejects and the error probability. The vacuum mat can be reused and reduces the material requirement.

Advantageous embodiments and improvements of the present invention are provided in the subclaims.

A basic idea of the invention is to use a reusable silicone vacuum bag in the form of a vacuum mat. This is produced with at least one receiving portion with a recess by means of a moulding component for shaping the geometric dimensions of the reinforcing element to be received. Thus, an already preformed "pocket" is provided into which rigid (precured or cured) or flexible (uncured) reinforcing elements, for example T-stringers can be introduced and can be positioned reproducibly together with the vacuum mat on the fibre composite component to be reinforced. The contour-accurate configuration of the "pockets", i.e. the recesses for the reinforcing elements in the vacuum mat makes it possible to produce so-called "net shape" stringers, which obviate milling the component after curing.

The vacuum mat is transported with the reinforcements introduced therein by a vacuum mat transportation means, suitable grippers of the transportation means cooperating with corresponding contact portions of the vacuum mat to ensure a simple and gentle picking up and setting down of the vacuum mat. The contact portions are preferably arranged on the receiving portions of the vacuum mat and can have components which allow a cooperation with the grippers in a mechanical, pneumatic and/or electromagnetic manner.

A cooperation with vacuum grippers is achieved, for example by a specific rigidity of the contact portion. For a mechanical cooperation, the contact portion can be provided, for example with seats corresponding to pegs of the grippers. For an electromagnetic cooperation, magnetisable portions, for example are present in the receiving portions which can easily be grasped and released by electromagnetic grippers by the connection and disconnection thereof, in order to allow a rapid lifting and setting down.

The vacuum mat transportation means also cooperates with suitable centring means of a base plate onto which the fibre composite component to be reinforced is positioned and over which the vacuum mat is applied. The centring means can be configured, for example as centring pins and centring holes on the edge of the base plate. This achieves a consistently identical, i.e. a reproducible positioning of the vacuum mat and thus of the reinforcing elements of the fibre composite component. When the vacuum mat has been brought into position, which can be indicated to a control means, for example via limit switches in the centring means, the grippers are opened and the vacuum mat transportation means is moved to the side, which can be performed, for example by a crane or a suitable rail structure.

The vacuum mat has a self-sealing portion arranged peripherally for sealing the vacuum mat from the atmosphere when contacting an associated contact surface. The sealing portion can preferably have a V-shaped sunk key, in which case a simple self-sealing can take place.

During the removal of the vacuum mat from the fibre composite component after at least the formed mould portion has cured to connect the at least one reinforcing element to the fibre composite component, the vacuum mat can be charged with air or a gas. For this purpose, closable air supply means are preferably arranged on the vacuum mat, through which the air or gas is blown in between the vacuum mat and its support. This measure advantageously facilitates the detachment of the vacuum mat.

Furthermore, it is advantageous that the at least one recess is provided with at least one incision in the extension of its longitudinal direction for removal from the mould, because during removal from the mould when air or gas is blown in, the incision widens and facilitates a gaping of the recess to release the reinforcing element arranged therein, thereby reducing the error probability.

The vacuum mat is suitable for both T and Ω or I stringers. It can also be used on U-stringer profiles, in which case, however, the positioning procedure of the stringer elements on the fibre composite component is omitted, since U profiles are largely a part of the base laminate of the fibre composite component and a T-profile is formed from two sides of the U in each case.

BRIEF DESCRIPTION OF THE DRAWINGS

In the following, the invention will be described in detail on the basis of embodiments with reference to the accompanying figures of the drawings.

DESCRIPTION OF EXEMPLARY EMBODIMENTS

Figure 1:
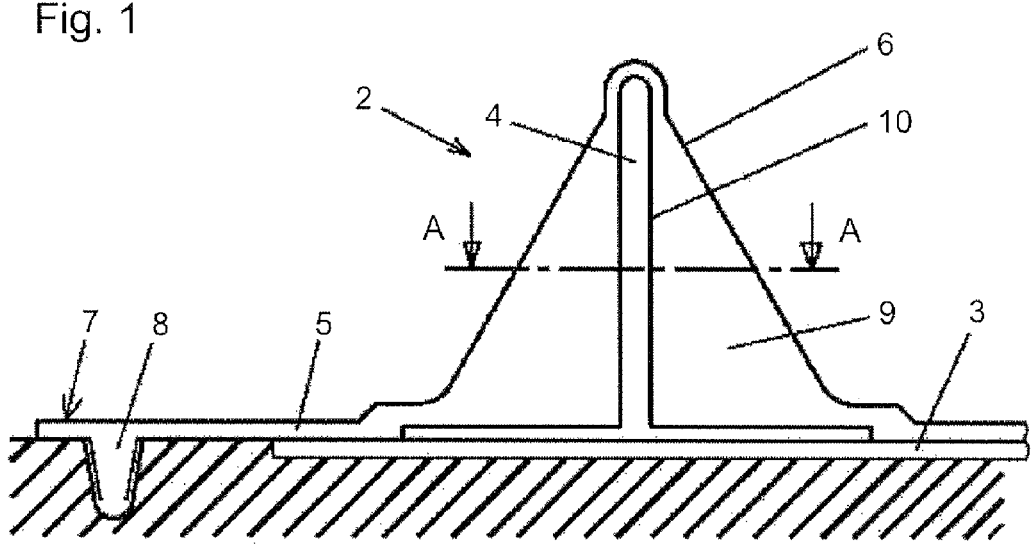
FIG. 1 is a schematic cross-sectional view of a mould portion of a fibre composite component with a first embodiment of a vacuum mat according to the invention with a receiving portion.

In the figures, the same reference numerals denote the same or functionally identical components, unless indicated otherwise.

FIG. 1 is a schematic cross-sectional view of a mould portion 2 of a fibre composite component portion 3 of a fibre composite component 1 (see FIG. 3) with a first embodiment of a vacuum mat 5 according to the invention with a receiving portion 6.

The fibre composite component portion 3 is arranged here on a base plate 24 of a production arrangement (see FIG. 9), which is described in more detail further below, and is provided for reinforcing by a reinforcing element 4, in this case a T-stringer by a vacuum infusion process in the illustrated mould portion 2.

For this purpose, the reinforcing element 4 was previously introduced in a different location into a recess 10, compatible with the reinforcing element 4, of the receiving portion 6 of the vacuum mat 5 and is completely enclosed by said recess 10. In this case, the vacuum mat 5 is produced from silicone.

In the receiving portion 6, the silicone material as a receiving body 9 surrounds the reinforcing element 4. Before the fibre composite component 1 is cured, the reinforcing element 4 can be pre-cured while it is unhardened, i.e. flexible, or it can be cured. It is supported by the receiving body 9.

Due to the nature of the material of the vacuum mat 5 (silicone, very soft and flexible), the vacuum mat 5 then has to be applied with the inserted reinforcing element 4 onto the fibre composite component portion 3, which is to be reinforced by the reinforcing element 4, by a suitable vacuum mat transportation device 12 which is described below in detail, such that the lower portion of the reinforcing element 3 rests directly on the fibre composite component portion 3. In so doing, the fibre composite component portion 3 and the reinforcing element 4 are covered by the vacuum mat 5 which seals off the structure from the atmosphere by a self-sealing portion 7 arranged peripherally on the edge of the vacuum mat. In this example, the sealing portion 7 has a V-shaped sunk key 8 which cooperates here in a groove, corresponding therewith, in the base plate 24.

The recess 10 in the receiving portion 6 of the vacuum mat 5 is configured as a preformed "pocket" by a dummy component during the production of the vacuum mat. In this respect, the dummy component is an originally-sized replica of the reinforcing element 4, as a result of which all the geometric characteristics of the reinforcing component 4 which is received later on in the recess 10 are reproduced.

Figure 2:
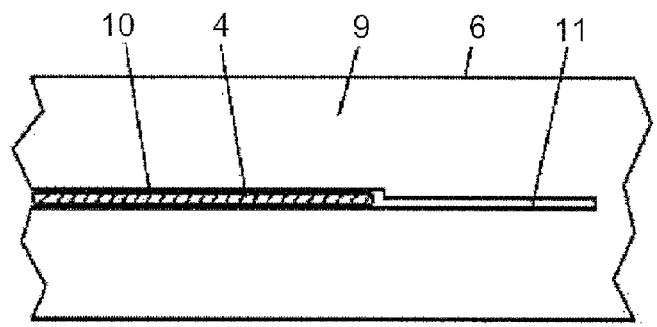
FIG. 2 is a cross-sectional view of the receiving portion along line A-A shown in FIG. 1.

The recess 10 is extended in its longitudinal direction by an incision 11, as can be seen in FIG. 2, which is a cross-sectional view of the receiving portion 6 along line A-A of FIG. 1. This incision 11 has the advantage that after the mould portion 2 has cured, a removal from the mould of the vacuum mat 5 is made easier, i.e. when the vacuum mat 5 is lifted up from the reinforcing element 4 which is then connected to the fibre composite component portion 3. This will be described in more detail further below.

Figure 3:
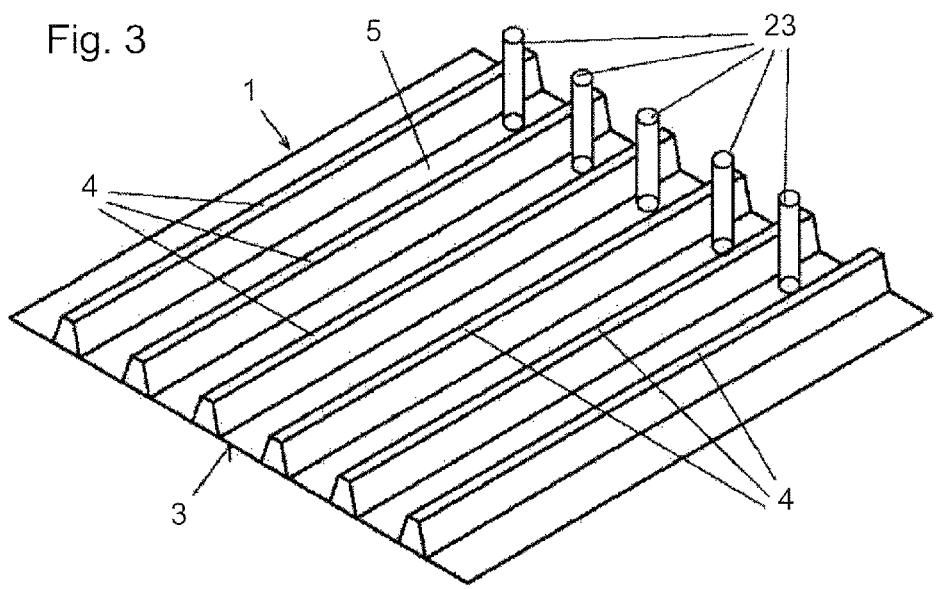
FIG. 3 is a perspective plan view of an exemplary fibre composite component with mould portions with a second embodiment of the vacuum mat according to the invention.

Only one reinforcing element 4 is shown in FIG. 1 and is described, but a plurality of reinforcing elements 4 can be required for reinforcing a fibre composite component 1, as FIG. 3 shows in a perspective plan view of an exemplary fibre composite component 1 with mould portions 2 with a second embodiment of the vacuum mat 5 according to the invention.

In FIG. 3, six reinforcing elements 4 are arranged on the fibre composite component portion 3 of the fibre composite component 1 and are covered by the vacuum mat 5 which, in this case, has a recess 10 for each reinforcing element 4. Furthermore, in this second embodiment, the vacuum mat 5 is fitted with closable air supply means 23, through which air or gas is blown in between the vacuum mat 5 and the fibre composite component portion 3 when the vacuum mat 5 is removed from the mould in order to facilitate the removal from the mould. In this respect, the incisions, show in FIG. 2, are widened by the air which is blown in and thus allow the receiving body 9 to be detached more easily from the respective reinforcing element 4.

Figure 4:
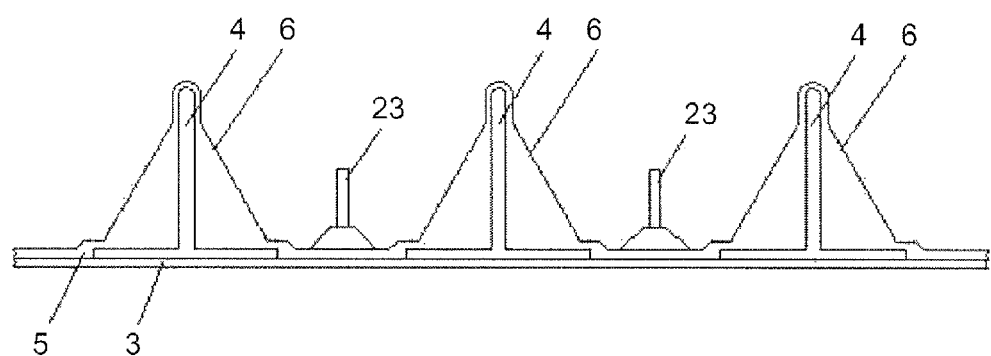
FIG. 4 is a schematic cross-sectional view of three mould portions of the fibre composite component with the second embodiment of the vacuum mat of the invention according to FIG. 3.

FIG. 4 is a schematic cross-sectional view of three mould portions 2 of the fibre composite component 1 with the second embodiment of the vacuum mat 5 of the invention according to FIG. 3, the closable air supply means 23 being configured as connecting pipes. A closing ability can be achieved manually, pneumatically or electrically/electromagnetically by valves (not shown). These air supply means 23 can also be used for applying a vacuum required for the vacuum infusion.

As mentioned above, the vacuum mat 5 is transported by a vacuum mat transportation device 12. For this purpose, the vacuum mat transportation device 12 has grippers 13 for handling the vacuum mat 5. A first embodiment of a gripper 13 is shown schematically in FIG. 5. In this example, the gripper 13 is equipped with two gripper arms 14, the upper ends of which are coupled in a joint in scissor-form such that they can pivot backwards and forwards in the direction of the arrows. Their lower ends are provided with vacuum gripper elements 15 which cooperate with the outside of the receiving body 9 of the receiving portion 6, shown here, of the vacuum mat 5. For this purpose, the receiving portion 6 has here reinforced contact portions 22 for the vacuum gripper elements 15. The gripper arms 14 can be pivoted, for example by a pneumatic or electromotive drive (not shown) or the like. To raise the vacuum mat 5, said gripper arms pivot towards the receiving portion 6, draw it up by suction and transport the vacuum mat 5 to predetermined positions.

Figure 5:
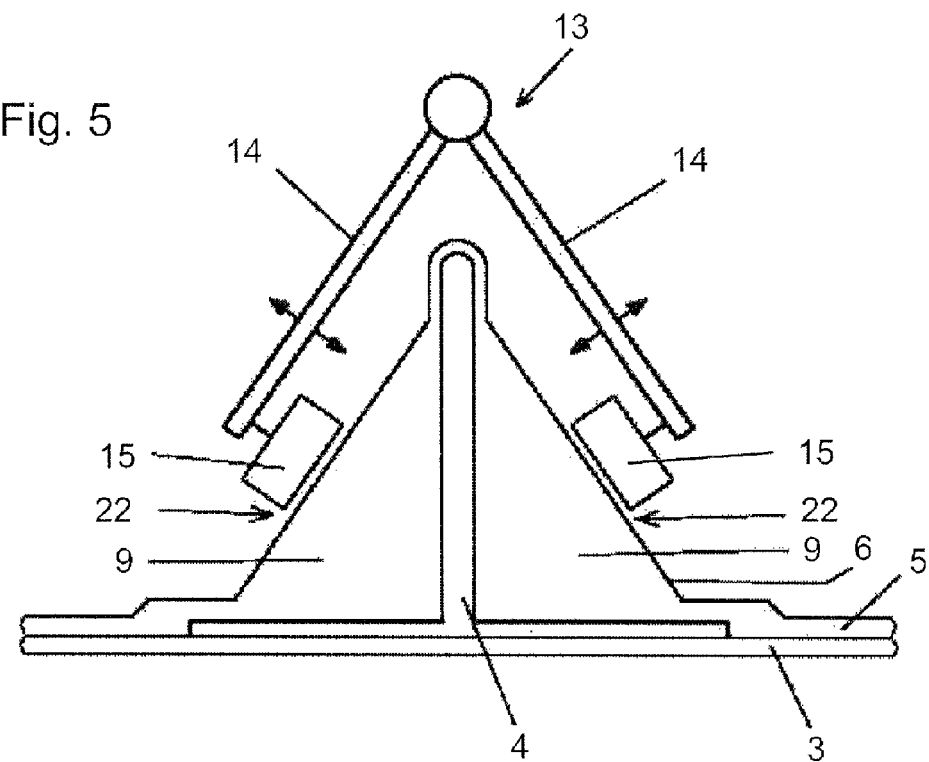
FIG. 5 is a schematic cross-sectional view of the receiving portion of the first or second embodiment of the vacuum mat according to the invention with a first embodiment of a vacuum mat transportation means.
Figure 6:
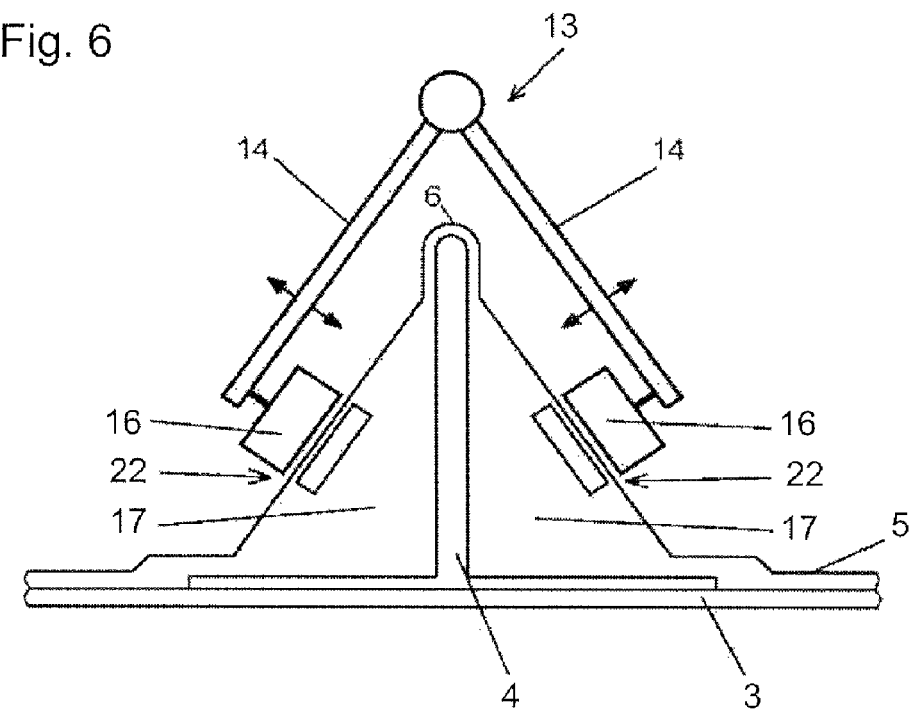
FIG. 6 is a schematic cross-sectional view of a receiving portion of a third embodiment of the vacuum mat according to the invention with a second embodiment of the vacuum mat transportation means.

Similarly to FIG. 5, FIG. 6 is a schematic cross-sectional view of a receiving portion 6 of a third embodiment of the vacuum mat 5 according to the invention with a second embodiment of the vacuum mat transportation means 12 which has electromagnetic gripper elements 16 which cooperate with magnetisable components 17 in the contact portions 22 in the receiving body 9 of the receiving portion 6 of the vacuum mat 5. The operation is easy to imagine.

Figure 7:
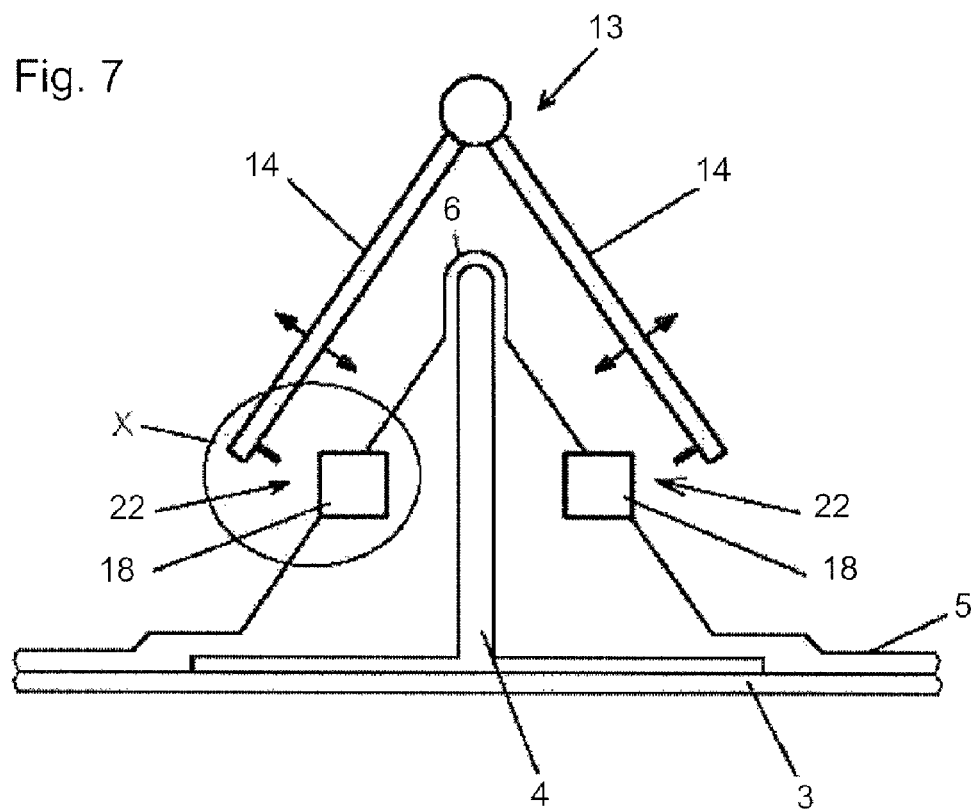
FIG. 7 is a schematic cross-sectional view of a receiving portion of a fourth embodiment of the vacuum mat according to the invention with a third embodiment of the vacuum mat transportation means.
Figure 8:
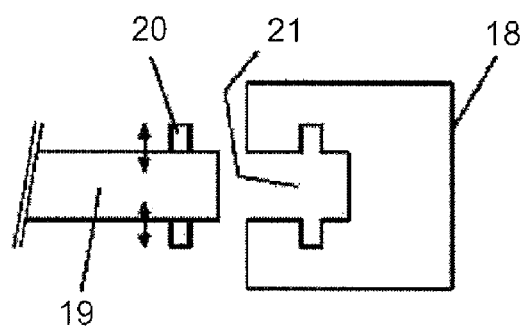
FIG. 8 is a schematic, enlarged view of a retaining portion characterised in FIG. 7 by an oval.

FIG. 7 shows a further mechanical gripper configuration, similar to FIGS. 5 and 6, in a schematic cross-sectional view of a receiving portion 6 of a fourth embodiment of the vacuum mat 5 according to the invention with a third embodiment of the vacuum mat transportation means 12. The lower ends of the gripper arms 14 are fitted with mechanical gripper elements 19 with, in this case, a rectangular body (for example a cuboid) which have in their longitudinal direction (arrows) adjustable pegs 20, as illustrated in FIG. 8 in an enlarged schematic view of the region marked by an oval in FIG. 7. The mechanical gripper elements 19 are introduced into seats 21 of engaging elements 18 in the contact portions 22 on the receiving portions 6 of the vacuum mat 5 for gripping the vacuum mat 5, the adjustable pegs 20 being retracted. When the rectangular bodies 19 have been fully received in the respective seat 21, the pegs 20 are moved out into corresponding recesses to produce a locking effect. The pegs 20 can be adjusted, for example by an electric motor, electromagnetically or pneumatically. For example, the pegs 20 can be drawn in pneumatically against a spring pressure and, upon reaching their recesses, can be locked therein by the spring pressure. Further mechanical gripper means are of course possible. Combinations of the examples shown here are also conceivable.

Figure 9:
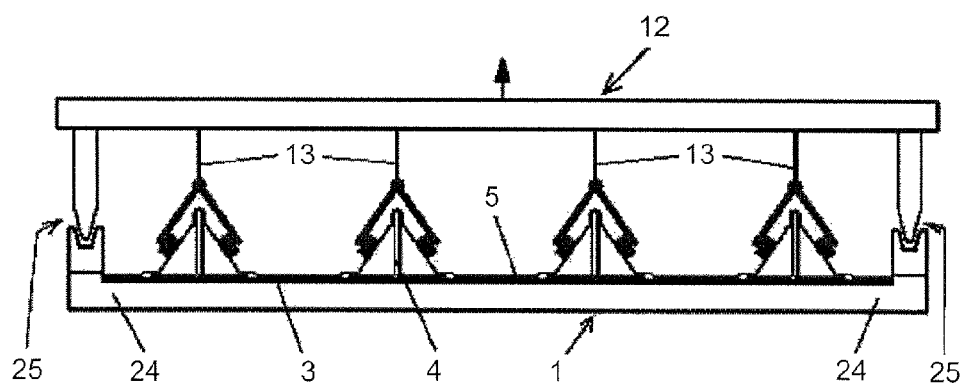
FIG. 9 is a schematic cross-sectional view of an exemplary arrangement according to the invention for the production of a reinforced fibre composite component.

FIG. 9 is a schematic cross-sectional view of an exemplary arrangement according to the invention for the production of a reinforced fibre composite component 1 with the above-mentioned vacuum mat transportation means 12.

The vacuum mat transportation means 12 can be of a modular configuration, for example, so that it can be easily adapted to fibre composite components 1 with different dimensions, it being possible for the same gripper means 13 to be used, for example. However, combinations are also conceivable.

In the illustrated example, the fibre composite component 1 positioned on the base plate 24 is to be reinforced with four reinforcing elements 4 which were previously received in the respective recesses 10 in the vacuum mat 5, as described above. This fitting procedure can be carried out, for example in a separate room or even next to the base plate 24. The vacuum mat transportation device 12 grasps the vacuum mat 5 equipped with the reinforcing elements 4 by the gripper means, as stated above and transports it to the base plate 24 shown here in FIG. 9. This can be performed in different ways, depending on the situation, for example by a crane mechanism or using a rail system.

For reproducible positioning, the base plate 24 and the vacuum mat transportation means 12 have in this case, on the edge of this component device, centring means 25, for example centring pins on the vacuum mat transportation means 12 and corresponding seats in the base plate 24.

When the vacuum mat 5 has been centred, positioned and deposited in a sealed manner, the gripper means 13 are opened, as described above and the vacuum mat transportation device 12 is moved to the side. Sealing is carried out here, as described above, by a self-sealing V-shaped sunk key seal. The fibre composite component 1 can then be cured. Thereafter, the vacuum mat transportation device 12 is again positioned over the vacuum mat 5 to raise the vacuum mat 5, as described above.

The arrangement can comprise a control means which is connected to the centring means 25, to drive means for moving the vacuum mat transportation device 12, to drive means for the gripper means 13 and to further indicating and sensor means. Consequently, the production of the reinforced fibre composite component 1 is automated such that a high reproducibility is achieved with a very low error probability, the vacuum mat 5 being reusable.

Although the present invention has been described here on the basis of preferred embodiments, it is not restricted thereto, but can be modified in many different ways.

For example, it is possible to work on and process not only T-stringers, but also reinforcing elements with other profiles, for example Ω and/or I-stringers, and also U-stringers by means of the invention and in the case of U-stringer profiles, particular positioning procedures are employed.

The vacuum mat 5 can be used not only for the stringers, i.e. for the reinforcing elements 4, but also for so-called stringer retaining profiles. Thus, a great versatility with an advantageous reusability is provided.

In a method for reinforcing a fibre composite component 1 for aviation and space flight, a vacuum mat 5 with at least one receiving portion 6 is configured for reproducibly receiving at least one reinforcing element 4. The at least one reinforcing element 4 is introduced into the at least one receiving portion 6 of the vacuum mat 5. The vacuum mat 5 with at least one introduced reinforcing element 4 is applied in a reproducible manner to the fibre composite component 1, to be reinforced, in a sealed manner to form a mould portion 2 and at least the formed mould portion 2 is cured to connect the at least one reinforcing element 4 to the fibre composite component. The vacuum mat 5 is then removed from the reinforced fibre composite component 1 and is prepared to be reused. A corresponding vacuum mat 5 and an arrangement for producing a corresponding reinforced fibre composite component 1.

LIST OF REFERENCE NUMERALS

1 fibre composite component
2 mould portion
3 fibre composite component portion
4 reinforcing element
5 vacuum mat
6 receiving portion
7 sealing portion
8 V-shaped sunk key
9 receiving body
10 recess
11 incision
12 vacuum mat transportation means
13 gripper means
14 gripper arm
15 vacuum gripper element
16 electromagnetic gripper element
17 magnetisable component
18 engaging element
19 mechanical gripper element
20 peg
21 seat
22 contact portion
23 air supply means
24 base plate
25 centring means

The invention claimed is:

1. A method for reinforcing a fibre composite component for aviation and space flight, with the following method steps:
configuring a vacuum mat, the vacuum mat comprising:
at least one receiving portion for receiving at least one reinforcing element, wherein the at least one receiving portion has a recess for receiving the reinforcing element and at least one incision joined to the recess for removal from the mould;
a peripherally arranged, self-sealing portion for sealing the vacuum mat from an atmosphere when positioned against an associated contact surface; and
at least one contact portion for cooperating with an associated vacuum mat transportation device;
introducing the at least one reinforcing element into the at least one receiving portion of the vacuum mat;
reproducibly applying the vacuum mat with the at least one introduced reinforcing element by the vacuum mat transportation device to the fibre composite component to be reinforced in a sealed manner to form a mould portion, the arrangement comprising:
a base plate for supporting the fibre composite component to be reinforced;
the vacuum mat; and
the vacuum mat transportation device with at least one gripper for cooperating with the at least one corresponding contact portion on the vacuum mat to transport the vacuum mat with at least one introduced reinforcing element into a predetermined position relative to the fibre composite component to be reinforced;
wherein the base plate and the vacuum mat transportation device have mutually corresponding centring element for a reproducible positioning of the vacuum mat relative to the fibre composite component to be reinforced and the base plate and the vacuum mat have mutually corresponding sealing elements for an encircling sealing of the vacuum mat from the atmosphere;
curing the formed mould portion to connect the at least one reinforcing element to the fibre composite component; and
removing the vacuum mat from the reinforced fibre composite component by the vacuum mat transportation device, wherein the incision of the receiving portion is widened and facilitates a gaping of the recess to release the at least one reinforcing element arranged therein.

2. The method according to claim 1, wherein when the vacuum mat is removed from the fibre composite component, the vacuum mat is charged with air or a gas.

3. The method according to claim 1, wherein the at least one reinforcing element is introduced into the receiving portion in an uncured, pre-cured or cured state.

4. The method according to claim 1, wherein when configuring the vacuum mat, the recess is provided with at least one incision in the extension of its longitudinal direction for removal from the mould.

5. The method according to claim 1, wherein when configuring the vacuum mat, the sealing portion is configured in the form of a V-shaped sunk key.

6. The method according to claim 1, wherein when configuring the vacuum mat, the vacuum mat is provided with at least one closable air supply device.

7. The method according to claim 1, wherein when configuring the vacuum mat, the at least one contact portion is arranged on the at least one receiving portion.

8. The method according to claim 1, wherein when configuring the vacuum mat, the at least one contact portion is configured with a corresponding rigidity for cooperating with a vacuum gripper of the vacuum mat transportation device.

9. The method according to claim 1, wherein when configuring the vacuum mat, the at least one contact portion is configured with a corresponding magnetisable component for cooperating with a magnetic and/or electromagnetic gripper of the vacuum mat transportation device.

10. The method according to claim 1, wherein when configuring the vacuum mat, the at least one contact portion is configured with a corresponding engaging element for cooperating with a mechanical gripper of the vacuum mat transportation device.

11. The method according to claim 1, wherein when configuring the vacuum mat, the vacuum mat is configured as a reusable silicone vacuum bag.

* * * * *